United States Patent [19]

Chen

[11] Patent Number: 4,852,594

[45] Date of Patent: * Aug. 1, 1989

[54] CONTACT LENS WASHING APPARATUS

[76] Inventor: Ching-Shih Chen, No. 18, Shuang Hsi Street, Sheh Lin District, Taipei, Taiwan

[*] Notice: The portion of the term of this patent subsequent to Oct. 11, 2005 has been disclaimed.

[21] Appl. No.: 132,936

[22] Filed: Dec. 15, 1987

[30] Foreign Application Priority Data

Sep. 4, 1987 [GB] United Kingdom ................ 8720204

[51] Int. Cl.[4] .............................................. B08B 3/04
[52] U.S. Cl. ..................................... 134/140; 74/70; 74/319; 134/158; 134/162; 206/5.1
[58] Field of Search .............. 134/140, 143, 157, 158, 134/162; 206/5.1; 366/243, 251, 278; 422/300, 301; 74/70, 318, 319, 322

[56] References Cited

U.S. PATENT DOCUMENTS

| 2,040,933 | 5/1936 | Gillen | 74/319 |
| 3,323,320 | 6/1967 | Conz | 366/251 X |
| 3,623,492 | 11/1971 | Frantz et al. | 206/5.1 |
| 3,997,049 | 12/1976 | Sherman | 206/5.1 |
| 4,776,360 | 10/1988 | Shih | 134/140 |

Primary Examiner—Philip R. Coe
Attorney, Agent, or Firm—Ladas & Parry

[57] ABSTRACT

A contact lens washing apparatus includes a body, a container mounted detachably on the body for receiving a washing liquid therein, and a porous basket mounted rotatably in the container for retaining a contact lens therein. A small motor in the body has a shaft which is connected to a speed reduction transmission. A rotational direction change mechanism interconnects with the speed reduction transmission and the basket for changing the unidirectional rotation output of the speed reduction transmission into the rotational reciprocating motion of the basket. That is, the basket will reciprocate alternately clockwise and counterclockwise to rinse the contact lens.

2 Claims, 4 Drawing Sheets

CONTACT LENS WASHING APPARATUS

BACKGROUND OF THE INVENTION

This invention relates to a contact lens washing apparatus which is power operated to efficiently remove impurities from the contact lens.

When cleaning a contact lens, the impurities deposited thereon are generally removed by using a piece of cleaning cloth held in hand, or by rubbing the lens between the fingers. It is difficult to efficiently clean a contact lens in this manner. In addition, touching and rubbing the contact lens with the cloth or fingers may cause the contact to be damaged.

SUMMARY OF THIS INVENTION

It is therefore the main object of this invention to provide a contact lens washing apparatus which is power operated to efficiently clean a contact lens.

According to this invention, the contact lens washing apparatus includes a body, a container mounted detachably on the body for receiving a washing liquid therein, and a porous basket mounted rotatably in the container for retaining a contact lens therein. A small motor has a shaft which is connected to a speed reduction transmission. A rotational direction change mechanism interconnects with the speed reduction transmission and the basket for changing the unidirectional rotation output of the speed reduction transmission into the rotational reciprocating motion of the basket. This is to say, the basket will reciprocate alternately clockwise and counterclockwise to rinse the contact lens with the washing liquid.

BRIEF DESCRIPTION OF THE DRAWINGS

Other features and advantages of this invention will become apparent from the following detailed description of a preferred embodiment of this invention with reference to the accompanying drawings in which.

DETAILED DESCRIPTION IOF THE PREFERRED EMBODIMENT

Figure 1:
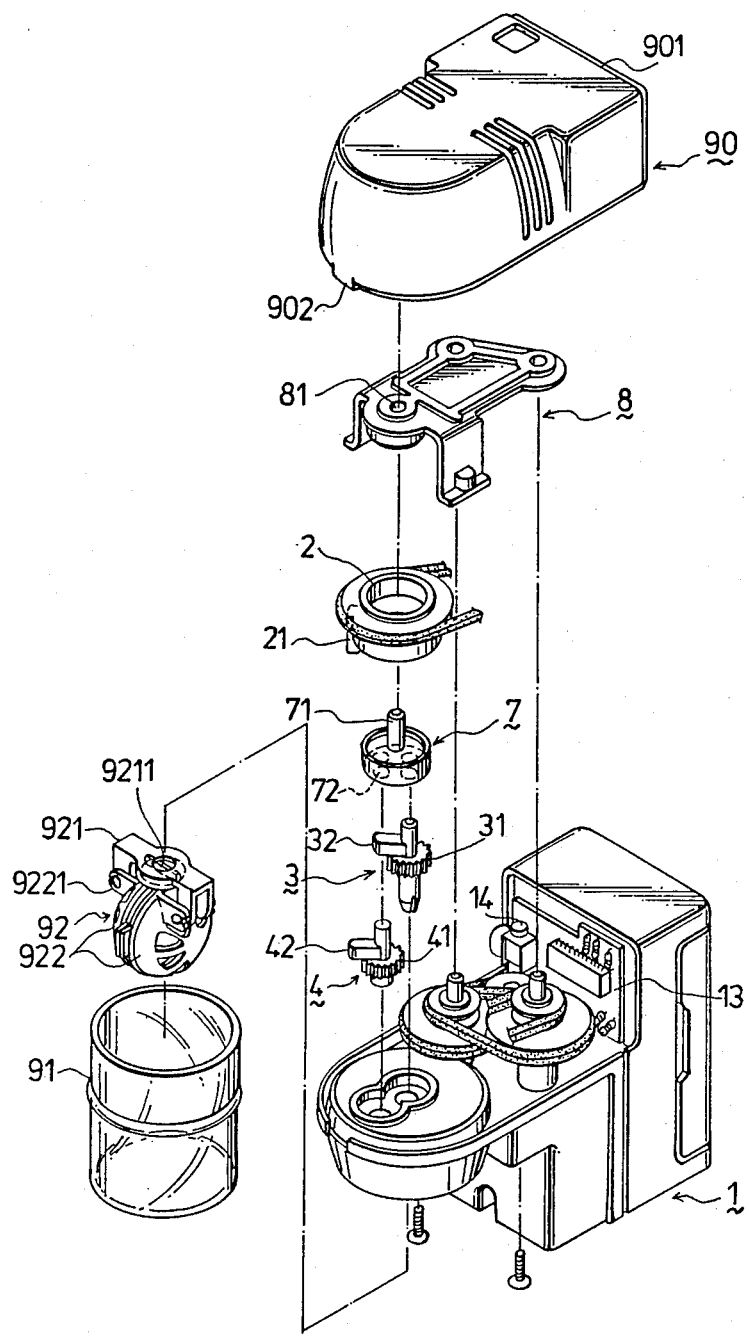
FIG. 1 is a partially exploded perspective view of a contact lens washing apparatus according to this invention.
Figure 2:
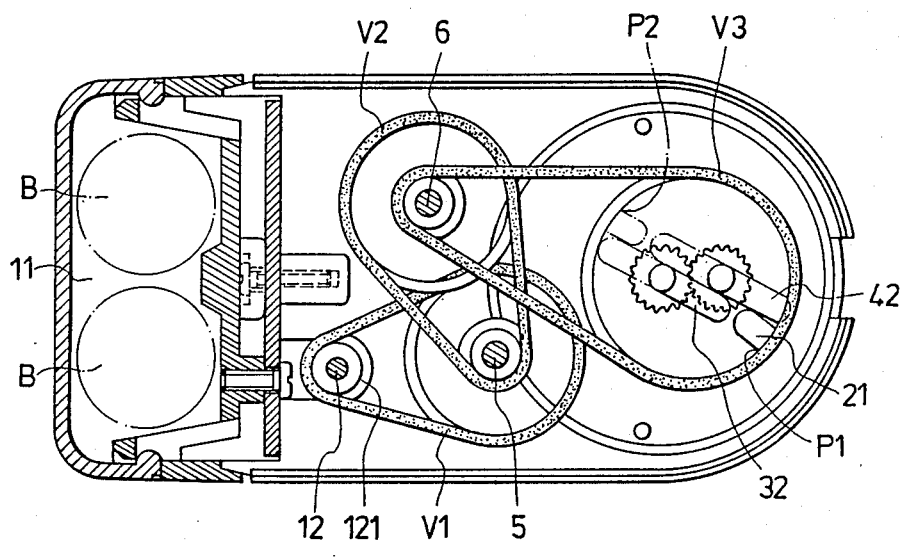
FIG. 2 is a cross sectional view of the contact lens washing apparatus according to this invention.
Figure 3:
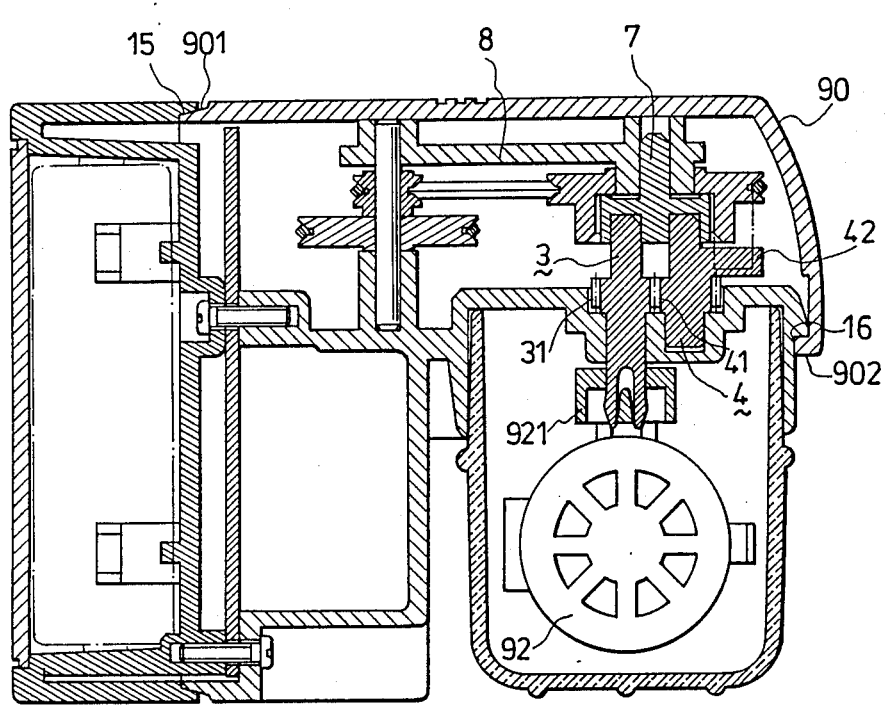
FIG. 3 is a longitudinal sectional view of the contact lens washing apparatus according to this invention.

Referring to FIGS. 1 through 3, a contact lens washing apparatus of this invention includes a body 1 which has a battery storage chamber 11 for receiving two batteries B therein. A battery operated small motor (not shown) has a motor shaft 12 on which a belt pulley 121 is fixed. A circuit board 13 is installed on the body 1. The motor is controlled by a switch 14.

A speed reduction transmission includes three interconnecting V-belt pulley assemblies V1, V2, and V3 in which the first assembly V1 is connected to the belt pulley 121 of the motor shaft 12 by a V-belt. The output end of the speed reduction transmission is provided with an annular member 2 which rotates at a speed lower than that of the motor shaft 12. A push rod 21 projects radially inwardly from the inner surface of the annular member 2.

First and second rotating shafts 3 and 4 are in parallel with each other. They are mounted inside the annular member 2 and interconnected by two similar spur gears 31 and 41 so that they always rotate in opposite directions at the same speed. Each of the rotating shafts 3, 4 has a swing arm 32, 42 projecting radially outwardly therefrom. The swing arms 32 and 42 are of the same size.

The upper ends of the first and second rotating shafts 3 and 4, and of the rotating shafts 5 and 6 of the speed reduction transmission are mounted rotatably on the body 1 by a disc 7, a support frame 8, and a cover 9.

The disc 7 includes an upper cylindrical rod 71, and four holes 72 formed in the bottom surface of the disc 7 in a square arrangement. The upper ends of the first and second rotating shafts 3 and 4 are inserted rotatably into two of the holes 72. The support frame 8 has three holes 81 for respectively receiving the upper ends of the cylindrical rod 71, the rotating shafts 5 and 6 of the speed reduction transmission therein. The cover 9 has a tapered end portion 91 for being first inserted into an upper groove of the body 1 while abutting against a tapered surface 15 thereof, and the opposite end having an inward flange 92 for subsequently retention by a shoulder 16 of the body 1.

A transparent container 91 of plastic is inserted tightly into a downward flange 17 of the body 1 after a washing liquid (not shown) and a contact lens (not shown) have been placed therein.

Figure 4:
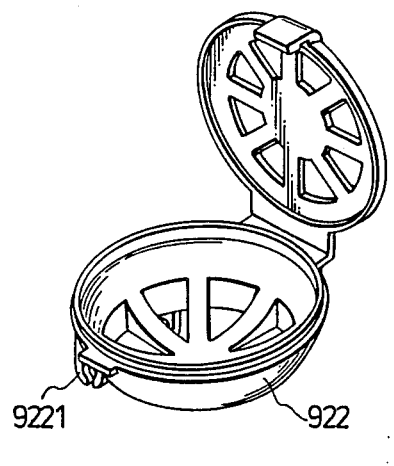
FIG. 4 is an exploded view showing a lens retaining basket of the contact lens washing apparatus according to this invention.

The first rotating shaft 3 has an open-ended slot (see FIG. 3) in the bottom surface thereof. A lightweight lens mounting member 92 includes a bracket 921 which has a horizontally extending strip 9211 for being inserted tightly into the slot of the first rotating shaft 3. Two lens retaining baskets 922 of plastic are secured to the lower end of the bracket 921 and extend into the container 91. As best seen from FIG. 4, the lens retaining basket 922 can be opened so that the left and right lenses are respectively retained within the baskets 922. Openings are formed in the baskets 922 so that the lenses disposed within the baskets 922 can be easily rinsed. In addition, each of the baskets 922 is provided with two aligned arms 9221 each of which has a pawl for gripping a cylindrical tongue provided on the mounting bracket 921.

Referring particularly to FIG. 2, when the push rod 21 is rotated to first position P1, as shown in the solid lines, it will contact the second swing arm 42 so as to impel the second swing arm 42 to rotate counterclockwise while permitting the first swing arm 32 to rotate clockwise. When the push rod 21, first swing arm 32, and second swing arm 42 travel a path of semicircle to reach second position P2, as shown in the phantom lines, the second swing arm 42 will separate from the push rod 21 thereby permitting the latter to contact the first swing arm 32, as shown in the phantom lines. Then, the push rod 21 rotate the first swing arm 32 counterclockwise back to its initial position shown in the solid lines while permitting the second swing arm 42 to rotate clockwise back to its initial position shown in the solid lines. At this position shown in the solid lines, next cycle can follow. It is understood that the push rod 21 impels alternately said first swing arm 32 and second swing arm 42 so that the gears 31 and 41 alternate in serving as an active gear.

Consequently, the first and second swing arms 32 and 42 always effect a reciprocating motion along a semicircular path in opposite directions so that the first rotating shaft 3 and hence the basket 92 always rotate alternately clockwise and counterclockwise for shaking the washing liquid to rinse the contact lens contained within the container 91.

With this invention thus explained, it is apparent that various modifications and variations can be made without departing from the scope and spirit of this invention. It is therefore intended that this invention be limited only as indicated in the appended claims.

I claim:

1. A contact lens washing apparatus comprising:
   a power supply;
   a motor having a shaft which is driven by said power supply to rotate at a first speed;
   a speed reduction transmission including an input end connected to said motor shaft, and an output end provided with an annular member which rotates at a second speed lower than said first speed, said annular member having an inner surface from which a push rod projects radially inwardly;
   a body for mounting said power supply, motor, and speed reduction transmission thereon;
   a container secured detachably to said body and adapted for receiving a washing liquid therein;
   a first rotating shaft disposed inside said annular member and having a first swing arm projecting radially outwardly therefrom;
   a lens mounting member including at least one basket secured to said first rotating shaft for retaining a contact lens therein, said basket extending into said washing liquid in said container and having openings so that said contact lens can be completely immersed in said washing liquid;
   a second rotating shaft disposed inside said annular member in parallel with said first rotating shaft and having a second swing arm projecting radially outwardly from said second rotating shaft;
   a gearing interconnecting said first and second rotating shafts so that said first and second rotating shafts always rotate in opposite directions; and
   said push rod always impelling alternately said first and second swing arms so that said basket can reciprocate clockwise and counterclockwise.

2. A contact lens washing apparatus as claimed in claim 1, whereinsaid speed reduction transmission includes three interconnecting V-belt pulley assemblies.

* * * * *